US012812314B2

(12) United States Patent
Tzinis et al.

(10) Patent No.: US 12,812,314 B2
(45) Date of Patent: Nov. 24, 2026

(54) REMOVAL OF SPATIAL ARTIFACTS FROM AUDIO

(71) Applicant: Google LLC, Mountain View, CA (US)

(72) Inventors: Efthymios Tzinis, Mountain View, CA (US); Pascal Getreuer, Mountain View, CA (US); Robert Dalton, Mountain View, CA (US); John Hershey, Mountain View, CA (US); Moonseok Kim, Mountain View, CA (US); Scott Wisdom, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/801,125

(22) Filed: Aug. 12, 2024

(65) Prior Publication Data

US 2026/0046578 A1 Feb. 12, 2026

(51) Int. Cl.
*H04S 3/00* (2006.01)
*H04S 7/00* (2006.01)

(52) U.S. Cl.
CPC ................ *H04S 3/008* (2013.01); *H04S 7/30* (2013.01); *H04S 2400/01* (2013.01); (Continued)

(58) Field of Classification Search
CPC ........ H04S 3/008; H04S 7/30; H04S 2400/01; H04S 2400/09; H04S 2400/11; H04S 2420/07
See application file for complete search history.

(56) References Cited

U.S. PATENT DOCUMENTS 10,818,302 B2 * 10/2020 Wang ..................... H04R 3/005
12,395,805 B2 * 8/2025 Zheng .................. G10H 1/0083
(Continued)

FOREIGN PATENT DOCUMENTS

EP 2747458 9/2015
EP 3172731 10/2018
(Continued)

OTHER PUBLICATIONS

Cobos, et al., "Stereo audio source separation based on time-frequency masking and multilevel thresholding", Digital Signal Processing, vol. 18, Issue 6, Nov. 2008, pp. 960-976.
(Continued)

*Primary Examiner* — David L Ton
(74) *Attorney, Agent, or Firm* — IP Spring

(57) ABSTRACT

An audio application determines a left magnitude of the audio source ($LS_k$) and a right magnitude of the audio source ($RS_k$). The audio application determines an amplitude difference ($D_k$). The audio application calculates a temporal derivative $d(D_k)$ of the $D_k$. The audio application determines an average of $LS_k$ and $RS_k$ to obtain a mid-channel spectrogram ($MCS_k$). The audio application normalizes the $MCS_k$ to obtain a normalized value ($R_k$). The audio application divides $d(D_K)$ by $R_k$ to obtain a confidence map. The audio application computes a blending weight by scaling and clipping the confidence map. The audio application combines the $MCS_k$, the blending weight, and the $L_t$ to obtain a left modified channel, and combining the $MCS_k$, the blending weight, and the $R_t$ to obtain a right modified channel.

20 Claims, 12 Drawing Sheets

(52) U.S. Cl.
CPC ....... *H04S 2400/09* (2013.01); *H04S 2400/11* (2013.01); *H04S 2420/07* (2013.01)

(56) References Cited

U.S. PATENT DOCUMENTS

| | | | |
|---|---|---|---|
| 2009/0060207 | A1 | 3/2009 | Barry et al. |
| 2020/0221242 | A1 | 7/2020 | Kim et al. |
| 2023/0245664 | A1 | 8/2023 | Master |

FOREIGN PATENT DOCUMENTS

| | | | | |
|---|---|---|---|---|
| EP | 3707716 | | 12/2021 | |
| WO | WO-2025111576 A1 | * | 5/2025 | H04S 7/304 |

OTHER PUBLICATIONS

Fitzgerald, "Stereo Vocal Extraction Using Address and Nearest Neighbours Median Filtering", Proc. of the 16th Int. Conference on Digital Audio Effects (DAFx-13), Sep. 2-4, 2013, 8 pages.

Grais, et al., "Raw Multi-Channel Audio Source Separation using Multi-Resolution Convolutional Auto-Encoders", https://arxiv.org/pdf/1803.00702, 2018, 5 pages.

Togami, et al., "Real-time stereo speech enhancement with spatial-cue preservation based on dual-path structure", ICASSP 2024-2024 IEEE International Conference on Acoustics, Speech and Signal Processing (ICASSP), 2024.

EPO, International Search Report for International Patent Application No. PCT/US2025/041525, Nov. 24, 2025, 4 pages.

EPO, Written Opinion for International Patent Application No. PCT/US2025/041525, Nov. 24, 2025, 5 pages.

Kraft, et al., "Stereo Signal Separation and Upmixing by Mid-Side Decomposition in the Frequency-Domain", 18th International Conference on Digital Audio Effects (DAFx), 2015, 6 pages.

MOIP, Office Action (with English translation) for Korean Patent Application No. 10-2026-7016204, Sep. 22, 2026, 15 pages.

* cited by examiner

REMOVAL OF SPATIAL ARTIFACTS FROM AUDIO

BACKGROUND

Audio processing for various reasons, such as audio source separation, noise removal, etc., involves modifying a source audio. When the source audio has spatial features, e.g., stereo audio including a left and a right channel, or multi-channel audio, such processing can result in artifacts being generated in the estimated or modified audio waveforms.

Sound source separation models decompose a complex audio signal composed of multiple overlapping audio sources into its constituent waveforms, including complex audio signals in stereo form (with separate left and right channels). The ability to isolate and reconstruct each audio source independently unlocks a wide range of possibilities for audio manipulation and analysis. For instance, users can apply specific audio effects, such as equalization or dereverberation to a single isolated audio source without affecting other elements of the mix; can remove or suppress a particular audio source; etc. Furthermore, separation algorithms can make possible detailed analysis of specific audio sources. Source-separation models that perform audio source separation, particularly those employing mask-based separation in the time-frequency domain, have demonstrated remarkable efficiency and effectiveness. These source-separation models operate by estimating a set of masks, one for each audio source, which are then used to filter the complex audio signal in the time-frequency domain, effectively separating different audio sources. This can then be applied on the time-frequency representation of the input audio and effectively separate the constituent sources to the input mixture recording.

However, despite their success, stereo sound separation models suffer from a critical limitation: introduction of artifacts that take the form of phase inconsistencies in multi-signal scenarios. Specifically, when stereo sound separation models perform independent estimation of masks for multiple signals representing the same audio—as is the case in stereo separation where the left and right audio signals are part of a same stereo audio—the resulting separated output can exhibit phase discrepancies. These manifest as a perceivable instability in the perceived location of the audio source to the listener. When audio is played back after being processed with a conventional mask-based stereo separation model, the audio can exhibit an unnatural "jumping" effect, where one or more audio sources shift erratically between the left and right signals, providing an undesirable effect of the source erratically shifting from the listener's left to the right or vice-versa. From a user perspective, such random, temporary shifts in the audio source spatial location can be jarring and lead to a less than satisfactory experience.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method modifies an audio stream comprising a plurality (n) of audio sources with a respective left ($L_t$) channel and a right ($R_t$) channel for each source, the audio sources being separated from an original audio stream, where the $L_t$ channel and the $R_t$ channel are in a time-frequency representation. The following steps are performed for each audio source (k). The method includes determining a left magnitude of the audio source ($LS_k$) and a right magnitude of the audio source ($RS_k$). The method includes determining an amplitude difference ($D_k$) between the $LS_k$ and the $RS_k$. The method includes calculating a temporal derivative $d(D_k)$ of the $D_k$. The method further includes determining an average of $LS_k$ and $RS_k$ to obtain a mid-channel spectrogram ($MCS_k$). The method further includes normalizing the $MCS_k$ based on a sum of mid-channel spectrograms for each of the separated audio sources ($MCS_1+MCS_2+\ldots+MCS_n$) to obtain a normalized value ($R_k$). The method further includes dividing $d(D_K)$ by $R_k$ to obtain a confidence map, wherein different regions of the confidence map are associated with respective likelihood values that indicate a respective likelihood that the region corresponds to a spatial artifact. The method further includes computing a blending weight by scaling and clipping the confidence map. The method further includes combining the $MCS_k$, the blending weight, and the $L_t$ to obtain a left modified channel, and combining the $MCS_k$, the blending weight, and the $R_t$ to obtain a right modified channel.

In some embodiments, the method further includes comprising performing a summation of the left modified channel of two or more of the audio sources to obtain a left output channel and a summation the right modified channel of the two or more of the audio sources to obtain a right output channel. In some embodiments, the method further includes performing an inverse Short-Time Fourier Transform (STFT) on the left output channel to obtain a left playback channel and on the right output channel to obtain a right playback channel, wherein the left playback channel and the right playback channel are usable to output audio via a speaker. In some embodiments, the method further includes receiving a command to erase a particular audio source, wherein the two or more of the audio sources exclude the particular audio source from the left playback channel and the right playback channel. In some embodiments, performing the summation comprises applying a respective weight to each of the two or more audio sources.

In some embodiments, the method further includes separating the original audio stream from a video; providing the original audio stream as input to a source-separation model; and outputting, with the source-separation model, the audio stream comprising the plurality of audio sources. In some embodiments, the method further includes prior to determining the $LS_k$ and the $RS_k$: receiving the original audio stream, the original audio stream including a left (L) signal and a right signal (R); applying STFT to the L signal and the R signal, respectively, to obtain the left channel $L_{st}$ and the right channel $R_{st}$; combining the $L_{st}$ and the $R_{st}$; applying a source-separation model to the combined $L_{st}$ and the $R_{st}$ to obtain respective masks for each of the plurality of audio sources; and performing a pointwise multiplication of the respective masks with the $L_{st}$ and the $R_{st}$ to obtain the plurality of audio sources with the respective $L_t$ and the $R_t$ for each audio source. In some embodiments, combining the $L_{st}$ and the $R_{st}$ comprises: calculating an average of the $L_{st}$ and the $R_{st}$; and calculating a magnitude of the average.

A non-transitory computer-readable medium to modify an audio stream comprising a plurality (n) of audio sources with a respective left ($L_t$) channel and a right ($R_t$) channel for each source, the audio sources being separated from an original audio stream, wherein the $L_t$ channel and the $R_t$ channel are in a time-frequency representation with instructions stored thereon that, when executed by one or more computers, cause the one or more computers to perform operations, the operations comprising, for each audio source (k). The operations include: determining a left magnitude of the audio source ($LS_k$) and a right magnitude of the audio source ($RS_k$); determining an amplitude difference ($D_k$) between the $LS_k$ and the $RS_k$; calculating a temporal derivative $d(D_k)$ of the $D_k$; determining an average of $LS_k$ and $RS_k$ to obtain a mid-channel spectrogram ($MCS_k$); normalizing the $MCS_k$ based on a sum of mid-channel spectrograms for each of the separated audio sources ($MCS_1+MCS_2+ \ldots +MCS_n$) to obtain a normalized value ($R_k$); dividing $d(D_K)$ by $R_k$ to obtain a confidence map, wherein different regions of the confidence map are associated with respective likelihood values that indicate a respective likelihood that the region corresponds to a spatial artifact; computing a blending weight by scaling and clipping the confidence map; and combining the $MCS_k$, the blending weight, and the $L_t$ to obtain a left modified channel, and combining the $MCS_k$, the blending weight, and the $R_t$ to obtain a right modified channel.

In some embodiments, the operations further include performing a summation of the left modified channel of two or more of the audio sources to obtain a left output channel and a summation the right modified channel of the two or more of the audio sources to obtain a right output channel. In some embodiments, the operations further include wherein the operations further include performing an STFT on the left output channel to obtain a left playback channel and on the right output channel to obtain a right playback channel, wherein the left playback channel and the right playback channel are usable to output audio via a speaker. In some embodiments, the operations further include receiving a command to erase a particular audio source, wherein the two or more of the audio sources exclude the particular audio source from the left playback channel and the right playback channel. In some embodiments, performing the summation comprises applying a respective weight to each of the two or more audio sources.

In some embodiments, the operations further include: separating the original audio stream from a video; providing the original audio stream as input to a source-separation model; and outputting, with the source-separation model, the audio stream comprising the plurality of audio sources. In some embodiments, the operations further include, prior to determining the $LS_k$ and the $RS_k$: receiving the original audio stream, the original audio stream including a left (L) signal and a right signal (R); applying STFT to the L signal and the R signal, respectively, to obtain the left channel $L_{st}$ and the right channel $R_{st}$; combining the $L_{st}$ and the $R_{st}$; applying a source-separation model to the combined $L_{st}$ and the $R_{st}$ to obtain respective masks for each of the plurality of audio sources; and performing a pointwise multiplication of the respective masks with the $L_{st}$ and the $R_{st}$ to obtain the plurality of audio sources with the respective $L_t$ and the $R_t$ for each audio source.

A computing device to modify an audio stream comprising a plurality (n) of audio sources with a respective left ($L_t$) channel and a right ($R_t$) channel for each source, the audio sources being separated from an original audio stream, wherein the $L_t$ channel and the $R_t$ channel are in a time-frequency representation. The computing device comprises a processor; and a memory coupled to the processor, with instructions stored thereon that, when executed by the processor, cause the processor to perform operations comprising, for each audio source (k): determining a left magnitude of the audio source ($LS_k$) and a right magnitude of the audio source ($RS_k$); determining an amplitude difference ($D_k$) between the $LS_k$ and the $RS_k$; calculating a temporal derivative $d(D_k)$ of the $D_k$; determining an average of $LS_k$ and $RS_k$ to obtain a mid-channel spectrogram ($MCS_k$); normalizing the $MCS_k$ based on a sum of mid-channel spectrograms for each of the separated audio sources ($MCS_1+MCS_2+ \ldots +MCS_n$) to obtain a normalized value ($R_k$); dividing $d(D_K)$ by $R_k$ to obtain a confidence map, wherein different regions of the confidence map are associated with respective likelihood values that indicate a respective likelihood that the region corresponds to a spatial artifact; computing a blending weight by scaling and clipping the confidence map; and combining the $MCS_k$, the blending weight, and the $L_t$ to obtain a left modified channel, and combining the $MCS_k$, the blending weight, and the $R_t$ to obtain a right modified channel.

In some embodiments, the operations further include performing a summation of the left modified channel of two or more of the audio sources to obtain a left output channel and a summation the right modified channel of the two or more of the audio sources to obtain a right output channel. In some embodiments, the operations further include wherein the operations further include performing an STFT on the left output channel to obtain a left playback channel and on the right output channel to obtain a right playback channel, wherein the left playback channel and the right playback channel are usable to output audio via a speaker. In some embodiments, the operations further include receiving a command to erase a particular audio source, wherein the two or more of the audio sources exclude the particular audio source from the left playback channel and the right playback channel. In some embodiments, performing the summation comprises applying a respective weight to each of the two or more audio sources.

DETAILED DESCRIPTION

The technology described herein leverages temporal dynamics of amplitude differences between stereo signals to automatically identify and suppress artifacts after initial source separation is performed on a mid-channel signal after an initial source separation model is applied on the input mid-channel mixture signal. The technology advantageously operates directly on pre-computed Short-Time Fourier Transforms (STFT) from a source separation model, making it computationally efficient. By automatically suppressing artifacts, the technology enhances the perceptual quality of the output audio obtained by combining the separated audio sources.

Example Environment

Figure 1:
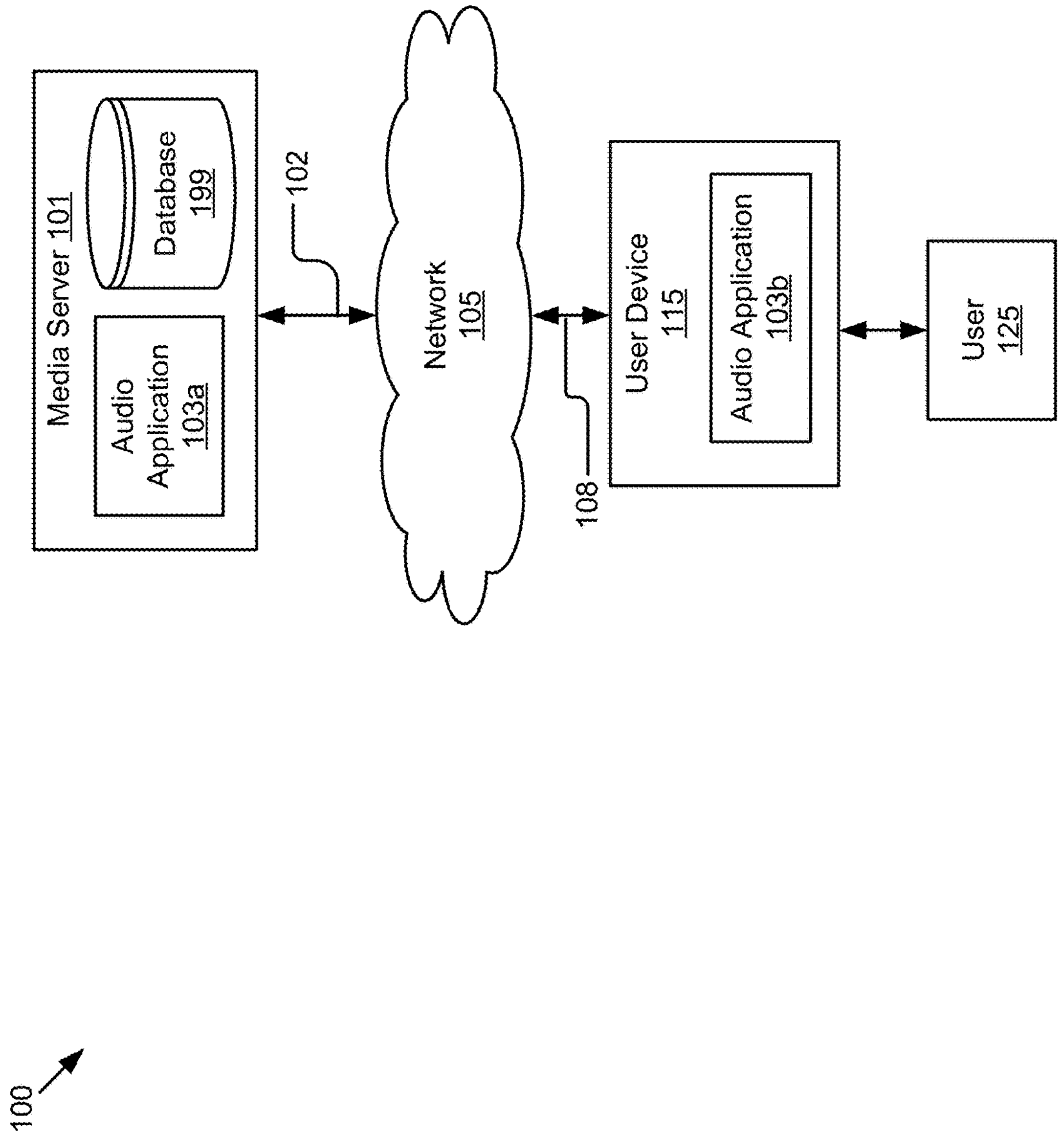
FIG. 1 is a block diagram of an example network environment to generate combined audio, according to some embodiments described herein.

FIG. 1 illustrates a block diagram of an example environment 100 to generate combined audio. In some embodiments, the environment 100 includes a media server 101 and a user device 115 that are coupled to a network 105. User 125 may be associated with user device 115. In some embodiments, the environment 100 may include other servers or devices not shown in FIG. 1. In FIG. 1 and the remaining figures, a letter after a reference number, e.g., "103*a*," represents a reference to the element having that particular reference number. A reference number in the text without a following letter, e.g., "103," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from the user device 115 via the network 105. The media server 101 may include an audio application 103*a* and a database 199.

The database 199 may store machine-learning models, training data sets, original videos, enhanced videos, etc. The database 199 may also store social network data associated with users 125, user preferences for the users 125, etc.

The user device 115 is a computing device that includes a memory coupled to a hardware processor. For example, the user device 115 may include a mobile device, a tablet computer, a laptop computer, a desktop computer, a mobile telephone, a wearable device, a head-mounted display, a mobile email device, a portable game player, a portable music player, or another electronic device capable of accessing a network 105.

In the illustrated implementation, user device 115 is coupled to the network 105 via signal line 108. Signal line 108 may be a wired connection, such as Ethernet, coaxial cable, fiber-optic cable, etc., or a wireless connection, such as Wi-Fi®, Bluetooth®, or other wireless technology. The user device 115 in FIG. 1 is used by way of example. While FIG. 1 illustrates one user device 115, the disclosure applies to a system architecture having one or more user devices 115.

The audio application 103 may be stored on the media server 101 or the user device 115. In some embodiments, the operations described herein are performed on the media server 101 or the user device 115. In some embodiments, some operations may be performed on the media server 101 and some may be performed on the user device 115. In some embodiments, the audio application 103*b* stored on the user device 115 receives updates from the audio application 103*a* stored on the media server 101.

Performance of operations is in accordance with user settings. For example, the user 125 may specify settings that operations are to be performed on the user device 115 and not on the media server 101. With such settings, operations described herein are performed entirely on user device 115 and no operations are performed on the media server 101. Further, a user 125 may specify that video and/or other data of the user is to be stored only locally on a user device 115 and not on the media server 101. With such settings, no user data is transmitted to or stored on the media server 101. Transmission of user data to the media server 101, any temporary or permanent storage of such data by the media server 101, and performance of operations on such data by the media server 101 are performed only if the user has agreed to transmission, storage, and performance of operations by the media server 101. Users are provided with options to change the settings at any time, e.g., such that they can enable or disable the use of the media server 101.

Machine learning models (e.g., neural networks or other types of models), if utilized for one or more operations, are stored and utilized locally on a user device 115, with specific user permission. Server-side models are used only if permitted by the user. Further, a trained model may be provided for use on a user device 115. During such use, if permitted by the user 125, on-device training of the model may be performed. Updated model parameters may be transmitted to the media server 101 if permitted by the user 125, e.g., to enable federated learning. Model parameters do not include any user data.

In some embodiments, the audio application 103 may be implemented using hardware including a central processing unit (CPU), a field-programmable gate array (FPGA), an application-specific integrated circuit (ASIC), machine learning processor/co-processor, any other type of processor, or a combination thereof. In some embodiments, the audio application 103*a* may be implemented using a combination of hardware and software.

The audio application 103 modifies an audio stream comprising a plurality (n) of audio sources with a respective left ($L_t$) channel and a right ($R_t$) channel for each source, the audio sources being separated from an original audio stream, wherein the $L_t$ channel and the $R_t$ channel are in a time-frequency representation. The audio application 103 determines a left magnitude of the audio source ($LS_k$) and a right magnitude of the audio source ($RS_k$). The audio application 103 determines an amplitude difference ($D_k$) between the $LS_k$ and the $RS_k$. The audio application 103 calculates a temporal derivative $d(D_k)$ of $D_k$. The audio application 103 determines an average of $LS_k$ and $RS_k$ to obtain a mid-channel spectrogram ($MCS_k$). The audio application 103 normalizes the $MCS_k$ based on a sum of mid-channel spectrograms for each of the separated audio sources ($MCS_1 + MCS_2 + \ldots + MCS_n$) to obtain a normalized value ($R_k$). The audio application 103 divides $d(D_K)$ by $R_k$ to obtain a confidence map, wherein different regions of the confidence map are associated with respective likelihood values that indicate a respective likelihood that the region corresponds to a spatial artifact. The audio application 103 computes a blending weight by scaling and clipping the confidence map. The audio application 103 combines the $MCS_k$, the blending weight, and the $L_t$ to obtain a left modified channel, and combining the $MCS_k$, the blending weight, and the $R_t$ to obtain a right modified channel.

Example Computing Device

Figure 2:
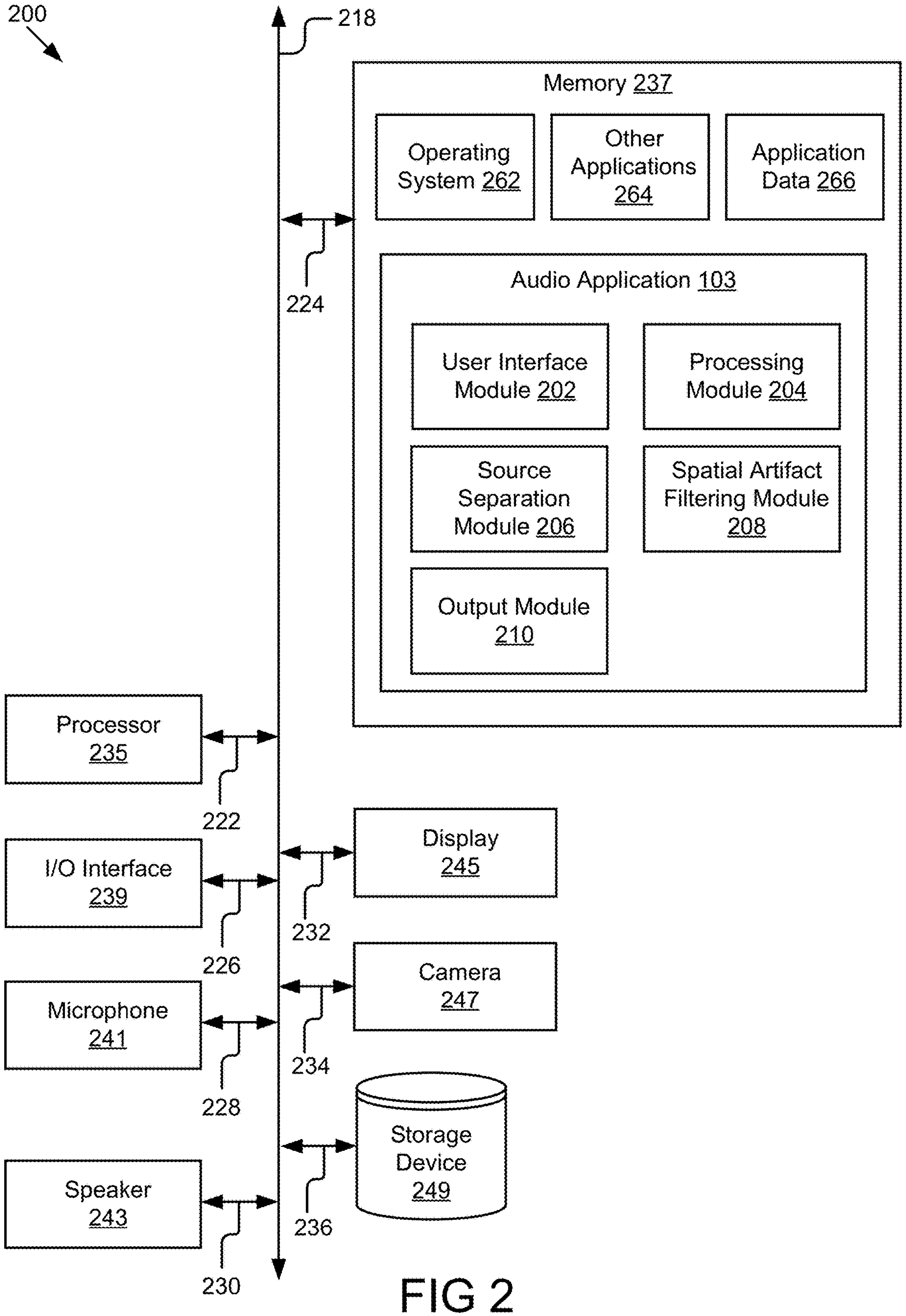
FIG. 2 is a block diagram of an example computing device to generate combined audio, according to some embodiments described herein.

FIG. 2 is a block diagram of an example computing device 200 that may be used to implement one or more features described herein. Computing device 200 can be any suitable computer system, server, or other electronic or hardware device. In one example, the computing device 200 is a media server 101 used to implement the audio application 103*a*. In another example, computing device 200 is a user device 115.

In some embodiments, computing device 200 includes a processor 235, a memory 237, an input/output (I/O) interface 239, a microphone 241, a speaker 243, a display 245, a camera 247, and a storage device 249, all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the display 245 may be coupled to the bus 218 via signal line 232, the camera 247 may be coupled to the bus 218 via signal line 234, and the storage device 249 may be coupled to the bus 218 via signal line 236.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including an audio application 103.

The memory 237 may include an operating system 262, other applications 264, and application data 266. Other applications 264 can include, e.g., a video library application, a video management application, a video gallery application, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include videos used by the video library application and user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 249), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, printers, monitors, etc.).

The microphone 241 may include hardware for detecting sounds. For example, the microphone 241 may detect ambient noises, people speaking, music, etc. using a single microphone 241 that is part of the user device 115. In some embodiments, the microphone 241 may include a plurality of audio sensors (e.g., two audio sensors, four audio sensors, or any number of audio sensors). In some embodiments, the microphone 241 sensors may detect audio from a mono clip-on microphone 241 for a videographer's speech, a stereo ambience microphone 241 for nature, and a mono directional microphone 241 for a specific person's speech. Audio detected by individual audio sensors of the microphone 241 may be combined to obtain audio signals.

The speaker 243 may include hardware for producing an audio signal that is audible to a user. In some embodiments, the speaker 243 includes an amplifier that is used to amplify certain channels, frequencies, etc. In some embodiments, the amplifier performs automatic gain control to ensure that a signal amplitude maintains a consistent output despite variation in the signal amplitude of the input signal. In some embodiments, the device may also support auxiliary audio playback, e.g., via headphones (wired or wireless), remote speakers (e.g., connected via Bluetooth or other protocol), etc.

A display 245 includes hardware to display content, e.g., images, video, and/or a user interface of an output application as described herein, and to receive touch (or gesture) input from a user. For example, display 245 may be utilized to display a user interface that includes user preferences for types of audio. Display 245 can include any suitable display device such as a liquid crystal display (LCD), light emitting diode (LED), or plasma display screen, cathode ray tube (CRT), television, monitor, touchscreen, three-dimensional display screen, or other visual display device. For example, display 245 can be a flat display screen provided on a mobile device, multiple display screens embedded in a glasses form factor or headset device, or a monitor screen for a computer device.

Camera 247 may be any type of image capture device that can capture images and/or video. In some embodiments, the camera 247 captures images or video that the I/O interface 239 transmits to the audio application 103.

The storage device 249 stores data related to the audio application 103. For example, the storage device 249 may store a training data set that includes training data, such as a plurality of labelled audio, a source-separation model, original audio, audio with spatial artifacts removed, etc.

FIG. 2 illustrates an example audio application 103 that includes a user interface module 202, a processing module 204, a source separation module 206, a spatial artifact filtering module 208, and an output module 210. In some embodiments, each of the components includes a set of instructions executable by the processor 235 to perform the steps discussed in greater detail below. In some embodiments, each of the components are stored in the memory 237 of the computing device 200 and can be accessible and executable by the processor 235. In some embodiments, one or more of modules 202-210 may be implemented in special purpose hardware, e.g., a digital signal processor, an audio processor, an FPGA or application-specific integrated circuit (ASIC), a machine learning processor, etc.

The user interface module 202 generates graphical data for displaying a user interface. In some embodiments, the user interface displays options for capturing a videos and/or audio. In some embodiments, the user interface module 202 generates a user interface that includes an option for a user to specify user preferences. The user preferences may include options for consenting to the processing of videos created by the user using the audio enhancement techniques described herein, transmitting videos and/or audio to the server for processing, etc. The user preferences may also include options for specifying preferences about types of auditory objects, such as an option to exclude a particular audio source. For example, the audio application 103 may identify four audio sources in an audio stream: a baby, a mother, a pet, and car noises. The user may select an option to exclude the car noises from the audio stream.

The processing module 204 processes audio. In some embodiments, the processing module 204 receives a video and separates an original audio stream from the video. In some embodiments, the processing module 204 receives the audio stream without reference to a video. For example, the processing module 204 may receive the audio from the speaker 243.

The original audio stream includes a left signal (L) and a right signal (R). The left signal and the right signal correspond to the left and right speakers, respectively, for creating stereo sound. The left signal and the right signals are each time-domain waveforms.

The processing module 204 applies Short-Time Fourier Transform (STFT) to the L signal and the R signal, respectively, to obtain a left channel ($L_{st}$) and a right channel ($R_{st}$). The STFT is calculated from the waveform of the left signal and the waveform of the right signal, respectively, by computing a discrete Fourier transform of a small, moving window across the duration of the window.

An STFT matrix is a two-dimensional complex-valued matrix where the location of each entry in the STFT determines its time and frequency. The frequency is represented as the y-axis of the spectrogram and time is represented as the x-axis of a spectrogram. A specific entry in the matrix is referred to as a time frequency bin. Each time frequency bin represents an amplitude of the audio signal at a particular time and frequency. The absolute value of a time frequency bin, i.e., $|X(t, f)|$ at time (t) and frequency (f) determines the amount of energy heard from frequency (f) at time (t). Each time frequency bin contains both a magnitude component and a phase component. The STFT matrix is used for separating the audio stream into audio sources and for manipulating the audio sources. The magnitude component and the phase component of the STFT matrix is used after manipulating the audio sources to invert the STFT matrix back to a waveform so that the audio sources are understandable to a human ear.

The processing module 204 combines the left channel and the right channel to form a single channel referred to as a combined $L_{st}$ and the $R_{st}$. In some embodiments, the processing module 204 combines the left channel and the right channel by calculating an average of the left channel and the right channel and a magnitude of the average of the left channel and the right channel. The processing module 204 provides the combined $L_{st}$ and the $R_{st}$ to the source separation module 206.

The source-separation model identifies a number (n) of estimated audio sources that constitute the original input mixture sound, which are identified as a summation of (k) independent ground truth source signals in the combined $L_{st}$ and the $R_{st}$. For example, if the audio is of a musical performance, the audio may separate the combined $L_{st}$ and the $R_{st}$ into a guitar audio source, a piano audio source, a voice audio source, and a drum audio source. The source separation module 206 outputs masks for each of the audio sources.

In some embodiments, the source-separation model is a machine-learning model. The source-separation model trained by the source separation module 206 may include one or more model forms or structures. For example, model forms or structures can include any type of neural-network, such as a linear network, a deep-learning neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., an input layer) may receive data as input data or application data 266. Such data can include, for example, one or more waveforms or STFTs per node, e.g., when the trained model is used for analysis, e.g., of audio. Subsequent intermediate layers may receive as input, output of nodes of a previous layer per the connectivity specified in the model form or structure. These layers may also be referred to as hidden layers. A final layer (e.g., output layer) produces an output of the machine-learning model. In some embodiments, model form or structure also specifies a number and/or type of nodes in each layer.

In some embodiments, the source separation module 206 may include a plurality of trained source-separation models. One or more of the source-separation models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may also include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processor cores of a multicore processor, using individual processing units of a graphics processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM).

In some embodiments, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The source-separation model may then be trained, e.g., using training data, to produce a result.

Training may include applying supervised learning techniques. In supervised learning, the training data can include a plurality of inputs (e.g., a plurality of training video clips) and a corresponding ground truth output for each input (e.g., ground truth channels of audio for particular audio sources from the audio clips). Based on a comparison of the output of the model (e.g., predicted channels) with the ground truth output (e.g., the ground truth channels), values of the weights are automatically adjusted, e.g., in a manner that increases a probability that the model produces the ground truth channels.

In various embodiments, a trained model includes a set of weights, or embeddings, corresponding to the model structure. In some embodiments, the trained source-separation model may include an initial set of weights, e.g., downloaded from a server that provides the weights. In various embodiments, a trained source-separation model includes a set of weights, or embeddings, corresponding to the model structure. In embodiments where data is omitted, the source separation module 206 may generate a trained source-separation model that is based on prior training, e.g., by a developer of the source separation module 206, by a third-party, etc.

In some embodiments, where the source-separation model includes a convolutional neural network trained using supervised learning, the training of the source-separation model may include, for each training clip, obtaining predicted channels based on the training clips. The source-separation model may calculate a loss value based on a comparison of the predicted channels and ground truth channels (included in the training data) for the audio clip. The source-separation model may update a weight of one or more nodes of the convolutional neural network based on the loss value (e.g., in a way that, after adjustment and running another cycle of the training, the loss value is reduced, till the loss value is below a threshold). In some embodiments, the source-separation model includes learnable convolutional encoder and decoder layers with a time-domain convolutional network masking network.

The processing module 204 receives the masks from the source separation module 206 and performs a pointwise multiplication of the respective masks with the $L_{st}$ and the $R_{st}$ to obtain the plurality of audio sources with a respective left ($L_t$) channel and a right ($R_t$) channel for each audio source. Thus, if four audio sources are identified and each audio source is associated with a left and right channel, the pointwise multiplication results in eight channels.

The audio sources are provided to the spatial artifact filtering module 208. Although the spatial artifact filtering module 208 receives audio sources that were processed using STFT, the filtering process may be used on audio represented by models other than STFT as well. The spatial artifact filtering module 208 leverages the temporal dynamics of amplitude differences between stereo channels to identify and suppress audio artifacts.

For each of the audio sources, the spatial artifact filtering module 208 operates as follows. The spatial artifact filtering module 208 determines a left magnitude of the audio source ($LS_k$) and a right magnitude of the audio source ($RS_k$). The spatial artifact filtering module 208 determines an amplitude difference ($D_k$) between the $LS_k$ and the $RS_k$. The spatial artifact filtering module 208 calculates a temporal derivative of the amplitude difference ($D_k$) between the $LS_k$ and the $RS_k$, referred to herein as $d(D_k)$. The spatial artifact filtering module 208 determines an average of $LS_k$ and $RS_k$ to obtain a mid-channel spectrogram ($MCS_k$). The spatial artifact filtering module 208 computes a relative source energy by normalizing the $MCS_k$ based on a sum of mid-channel spectrograms for each of the separated audio sources ($MCS_1+MCS_2+ \ldots +MCS_n$) to obtain a normalized value ($R_k$).

The spatial artifact filtering module 208 divides $d(D_K)$ by $R_k$ to obtain a confidence map. The confidence map is divided into different regions that are associated with respective likelihood values that indicate a respective likelihood that the region corresponds to a spatial artifact and not the audio source. When a region is likely to be caused by a spatial artifact and not the audio source, the spatial artifact filtering module 208 replaces the region with a mid-channel estimation.

The spatial artifact filtering module 208 computes a blending weight by scaling and clipping the confidence map. The blending weight determines the amount of mid-channel information to blend with the original channel signal. The blending weight is referred to below as an alpha array. The spatial artifact filtering module 208 combines the $MCS_k$, the blending weight, and the $L_t$ to obtain a left modified channel, and combines the $MCS_k$, the blending weight, and the $R_t$ to obtain a right modified channel.

The output module 210 receives, for each of the audio sources, a left modified channel and a right modified channel from the spatial artifact filtering module 208. The output module 210 performs a summation of the left modified channel of two or more of the audio sources to obtain a left output channel and a summation of the right modified channel of two or more of the audio sources to obtain a right output channel.

The output module 210 performs an inverse STFT on the left output channel and the right output channel to obtain source stereo waveforms (i.e., a source left waveform and a source right waveform). In some embodiments, the output module 210 merges some sources by summing their waveforms to a reduced number of tracks. The merger avoids presenting near silent or redundant sources in isolation during playback that the user hears while modifying audio sources in a user interface.

In some embodiments, a user may request to erase a particular audio source, such as an audio source that corresponds to construction noise. The user may specify the request to erase the audio source via a user interface. Responsive to the user requesting to erase the particular audio source, the output module 210 excludes the particular audio source from the two or more audio sources.

In some embodiments, a user may request to increase or decrease levels of audio for the different audio sources. For example, if the audio sources are speech, music, and nature, the user may want to increase the sound level of the speech and decrease the sound levels of the music and nature audio sources.

In some embodiments, the output module 210 applies a respective weight to the two or more audio sources. For example, desirable audio sources (e.g., human speech, musical instruments, etc.) are associated with higher weights than audio sources that are distractions (e.g., background noise such as traffic, construction, crowd noise, a background hum, etc.; temporary loud sounds, such as car horns; etc.). The output module 210 may determine the respective weights based on the user specifying types of preferred audio sources. In some embodiments, a weight of 0 for an audio source is associated with an erased audio source.

The output module 210 sums the source stereo waveforms based on the weights to form a left playback channel and a right playback channel. In some embodiments, the left playback channel and the right playback channel are passed through a limiter to prevent audio clipping. The result from the limiter may be provided to the speaker 243 for output. In some embodiments, the output module 210 retains the original phase information from the input STFTs.

Example Method

Figure 3A:
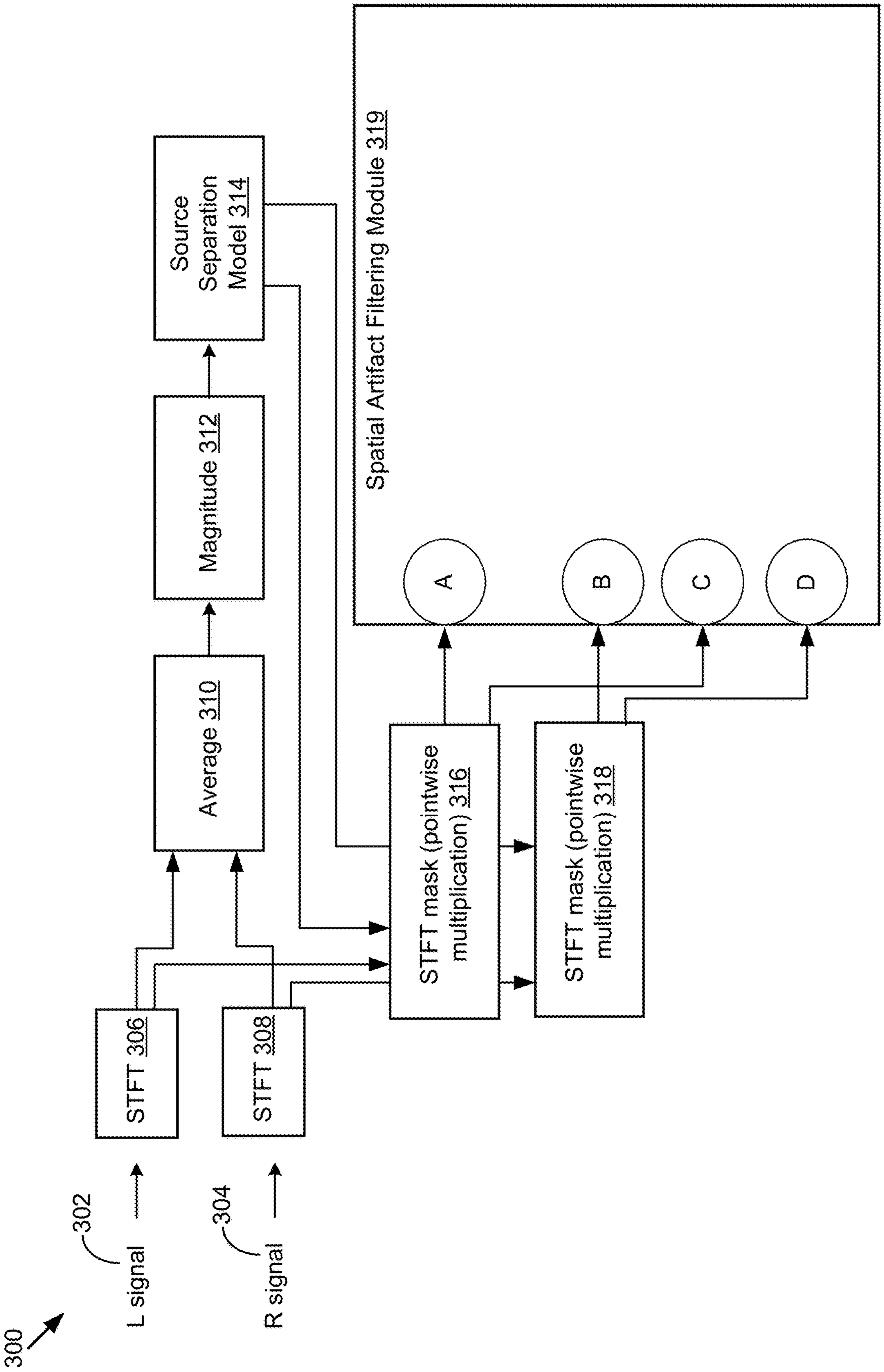
FIGS. 3A-B illustrate a flowchart of an example method to remove spatial artifacts in audio using a spatial artifact filtering module, according to some embodiments described herein.
Figure 3B:
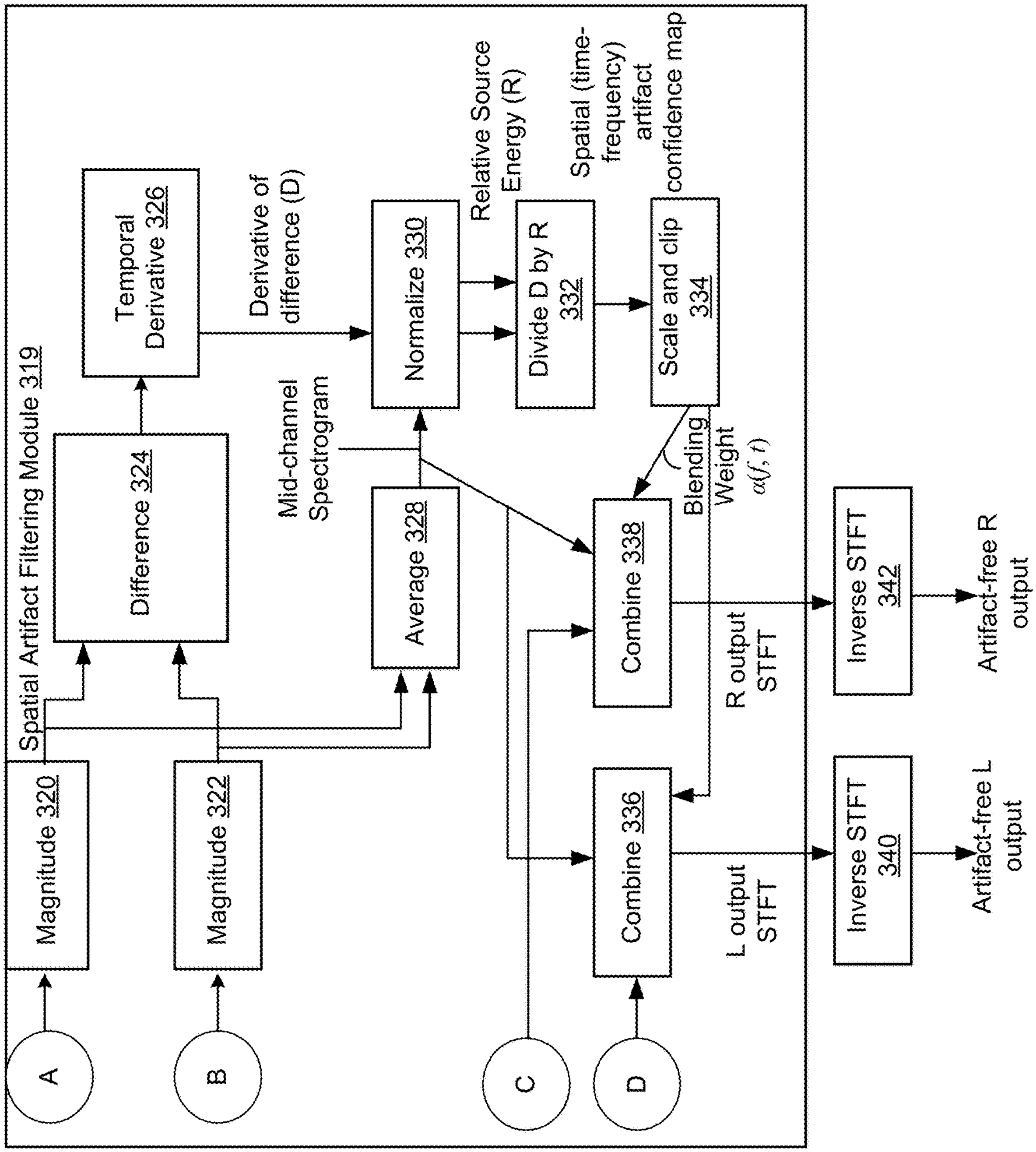

FIGS. 3A-B illustrate a flowchart of an example method 300 to remove spatial artifacts in audio using a spatial artifact filtering module, according to some embodiments described herein. The method begins with receiving an audio stream that includes an L signal 302 and an R signal 304. STFT 306 is applied to the L signal 302 and STFT 308 is applied to the R signal 304 to obtain a left channel $L_{st}$ and a right channel $R_{st}$, respectively. The left channel and the right channel are averaged 310 and a magnitude 312 of the average 310 is determined. This is referred to as the mid-channel. The mid-channel is provided as input to the source separation model 314.

The source separation model 314 outputs masks for each audio source that is present in the average channel. Point-wise multiplication of the respective masks with the left channel 316 and the right channel 318 is performed to obtain the plurality of audio sources with the respective left channel and the right channel for each audio source. The audio sources are provided to the spatial artifact filtering module 319.

For each audio source provided to the spatial artifact filtering module 319 the following operations are performed. A magnitude of the left channel 320 and a magnitude of the right channel 322 of the audio source are determined. An amplitude difference 324 between an absolute value of the magnitude of the left channel and an absolute value of the magnitude of the right channel of the audio is determined. In some embodiments, instead of a magnitude of the left channel and the right channel being calculated, a square of the magnitude of the left channel and a square of the left channel is calculated. A temporal derivative 326 of the amplitude difference is determined, e.g., using centered finite differences in time. In some embodiments, the temporal derivative 326 is calculated using the following equation:

$$\text{time gradient delta amplitudes} = \text{gradient amplitude difference}/(\text{amplitude difference} + 1e^{-9}) \quad \text{Eq. 1}$$

An average 328 of the left magnitude of the audio source and a right magnitude of the audio source is determined to obtain a mid-channel spectrogram. For example, the equation to calculate the mid-channel spectrogram may be an absolute value of a sum of the left magnitude and the right magnitude divided by 2. The mid-channel spectrograms for all audio sources are summed and normalized 330 to obtain a relative source energy for each respective audio source. The temporal derivative is divided by the relative source energy 332 to create a spatial (time-frequency) artifact confidence map. In some embodiments, the spatial artifact confidence map is calculated using the following equation:

$$\text{spacial artifacts confidence} = \text{time gradient delta amplitudes/relative source energy} \quad \text{Eq. 2}$$

$$\text{gradient amplitude difference} * (\text{sum of all sources mid-channel sepctogram})/[(\text{amplitude difference}+1e^{-9}) * \text{mid-channel spectogram}] \quad \text{Eq. 3}$$

A blending weight is computed by scaling and clipping 334 portions of the confidence map. In some embodiments, the blending weight is calculated using the following equation:

$$\alpha = \text{clip}(\text{spatial artifacts confidence}/(\text{spacial artifact tolerance} + 1e^{-9}), 0, 1) \quad \text{Eq. 4}$$

The mid-channel spectrogram, the blending weight, and the left channel are combined 336 to obtain a left output STFT (also known as a left-modified channel). The mid-channel spectrogram, the blending weight, and the right channel are combined 338 to obtain a right output STFT (also known as a right-modified channel). The spatial artifacts are substantially reduced or removed in the left-modified and right-modified channels compared to the output from the source separation model 314. The complex phases of the output STFTs are the same as the input stereo STFT phases. In some embodiments, the amplitudes are replaced using the following equation:

$$\text{new apmlitude} = (1-\alpha) * \text{initial channel amplitude} + \alpha * \text{mid-channel amplitude} \quad \text{Eq. 5}$$

In some embodiments, the left output STFTs and the right output STFTs for each of the audio sources, respectively, are combined. In some embodiments, the left output STFTs and the right STFTs for each of the audio sources, excluding those corresponding audio sources that were requested by a user to be erased, respectively, are combined. An inverse STFT 340 is applied to the combined left output STFTs to obtain an artifact free left output. An inverse STFT 342 is applied to the combined right output STFTs to obtain an artifact free right output. Once the inverse STFTs 340, 342 are applied, the output is audible to a user.

The process described above is illustrated in example spectrograms in FIGS. 4-9. In each of the spectrograms, the white vertical bands represent speech. The ridges within the white vertical bands represent artifacts, such as background noise. The goal of the filtering process is to reduce the ridges and smooth out the appearance of the ridges.

Figure 4:
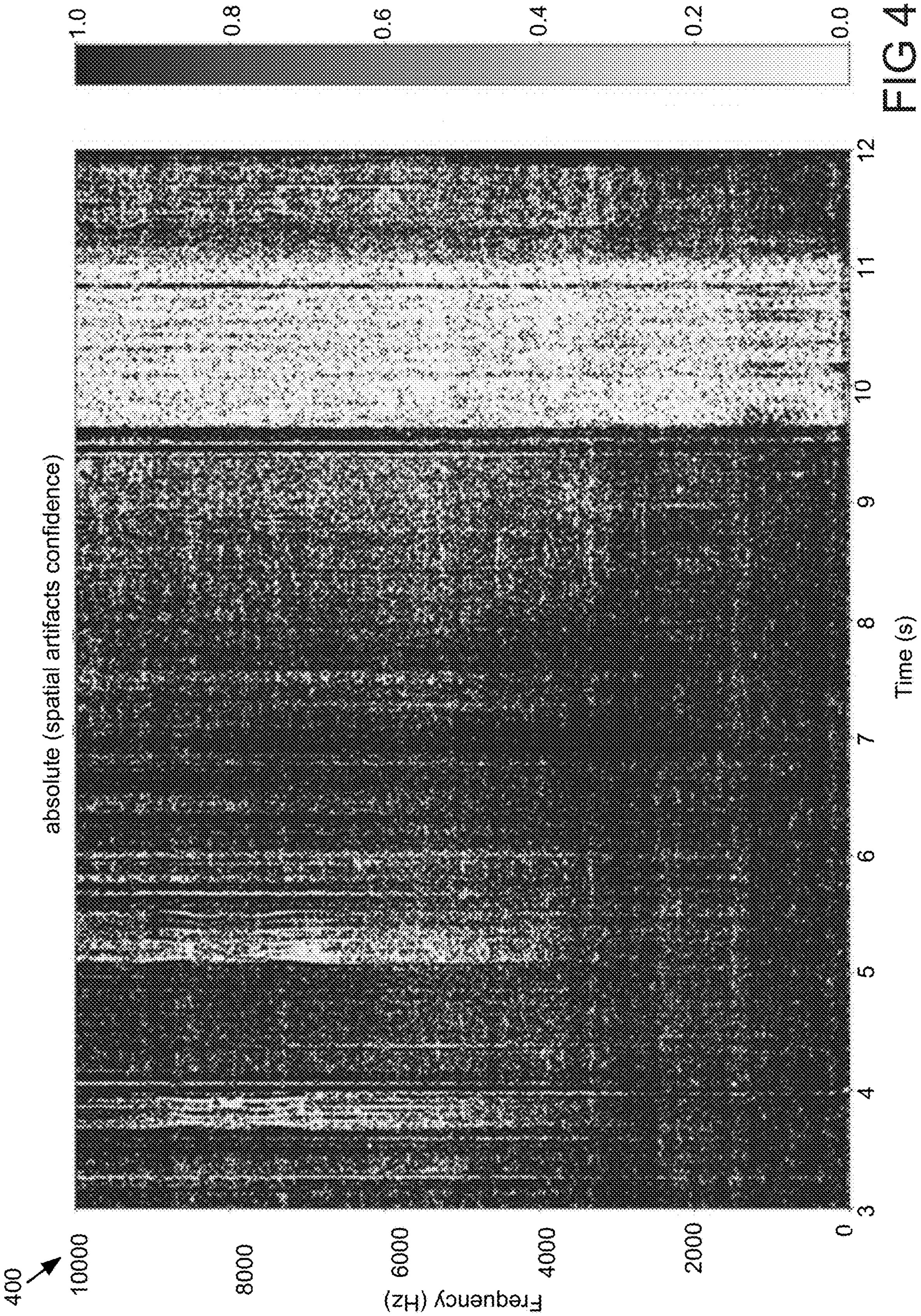
FIGS. 4-9 illustrate different example spectrograms, according to some embodiments described herein.

FIG. 4 is an example spectrogram 400 that includes an absolute value of the spatial artifact confidence. The spatial confidence is a 2D array of the same dimensions as the STFTs. The spatial confidence represents a confidence for every time-frequency cell whether artifacts occur in that cell, with a larger value (darker in the plot) implying greater confidence of an artifact.

Figure 5:
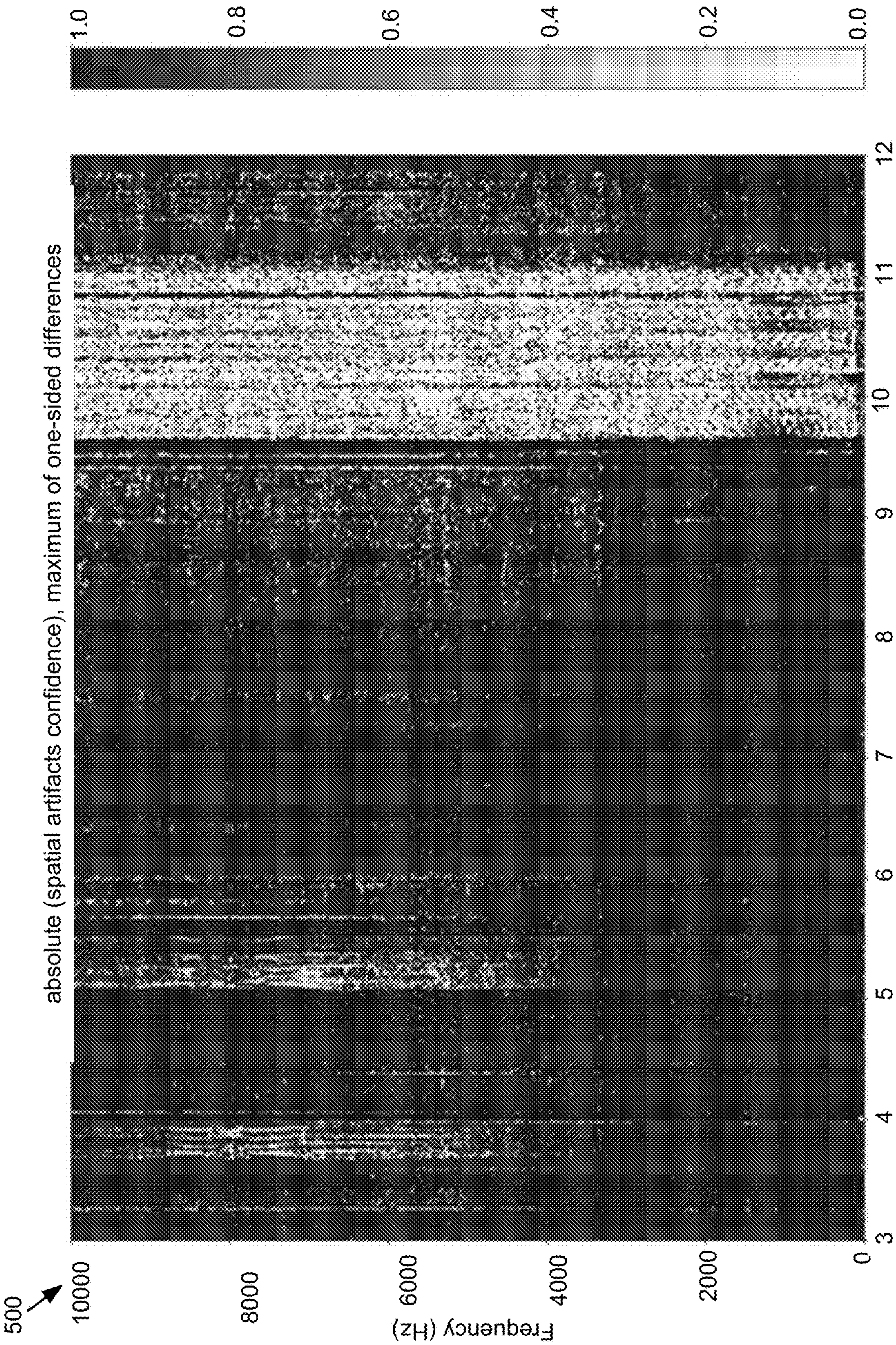

FIG. 5 is an example spectrogram 500 that includes a robust derivative of an absolute value of the spatial artifact confidence and a maximum of one-sided differences. In some embodiments, both forward and backward one-sided differences of a spectrogram are calculated over time and the side that includes a maximum magnitude is selected. The robust derivative doubles the temporal resolution while still giving a centered estimate, resulting in a cleaner confidence map.

Figure 6:
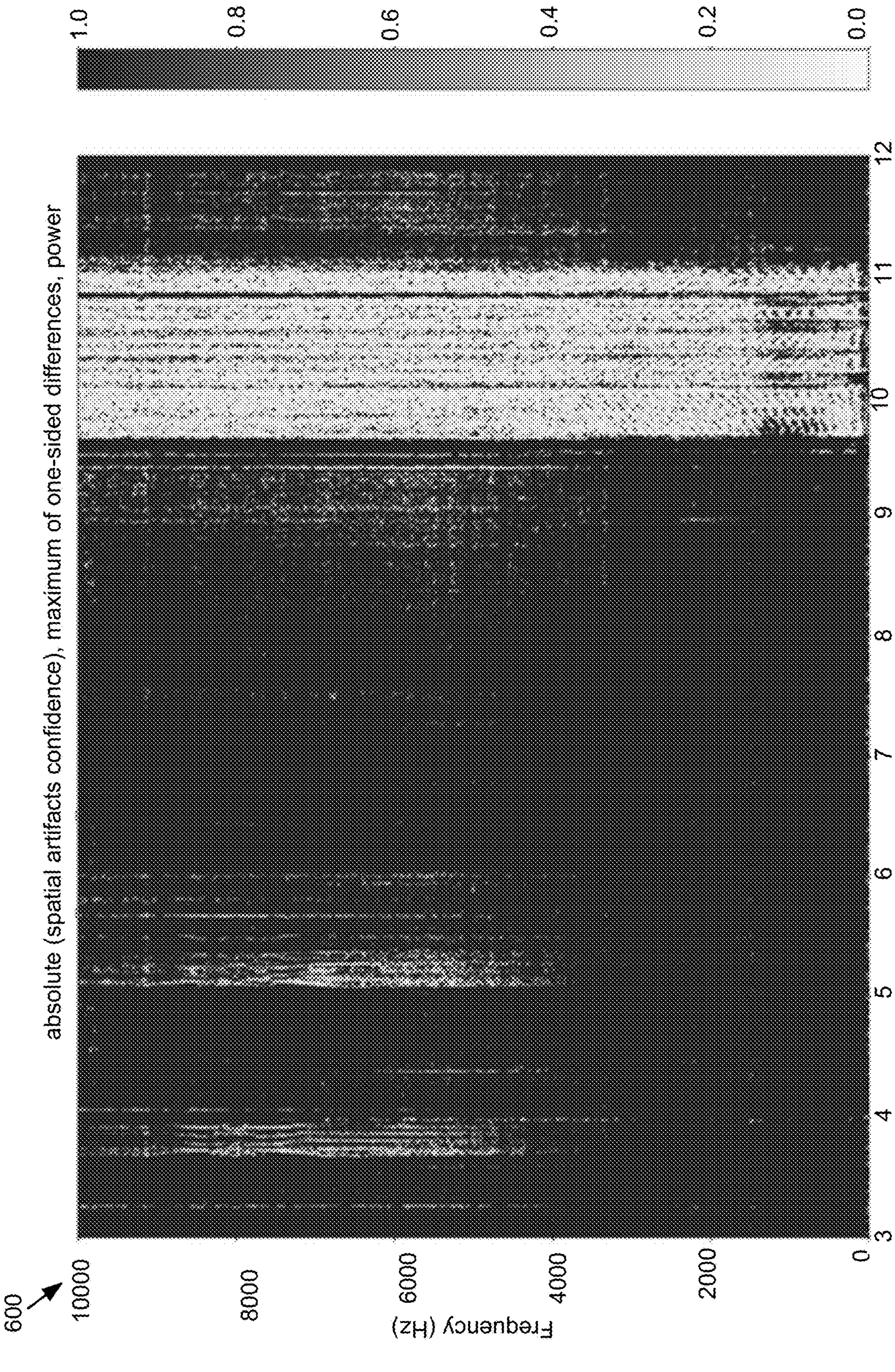

FIG. 6 is an example spectrogram 600 of another embodiment for performing spatial artifact filtering that uses an absolute value of the spatial artifact confidence, a maximum of one-sided differences, and a power. Instead of calculating an amplitude difference between an absolute value of the magnitude of the left channel and an absolute value of the magnitude of the right channel, filtering is performed on powers instead where using the equation $f(x)=|x|^2$ is smooth at $x=0$ while $|x|$ is not, may improve the accuracy of the derivative estimate.

Figure 7:
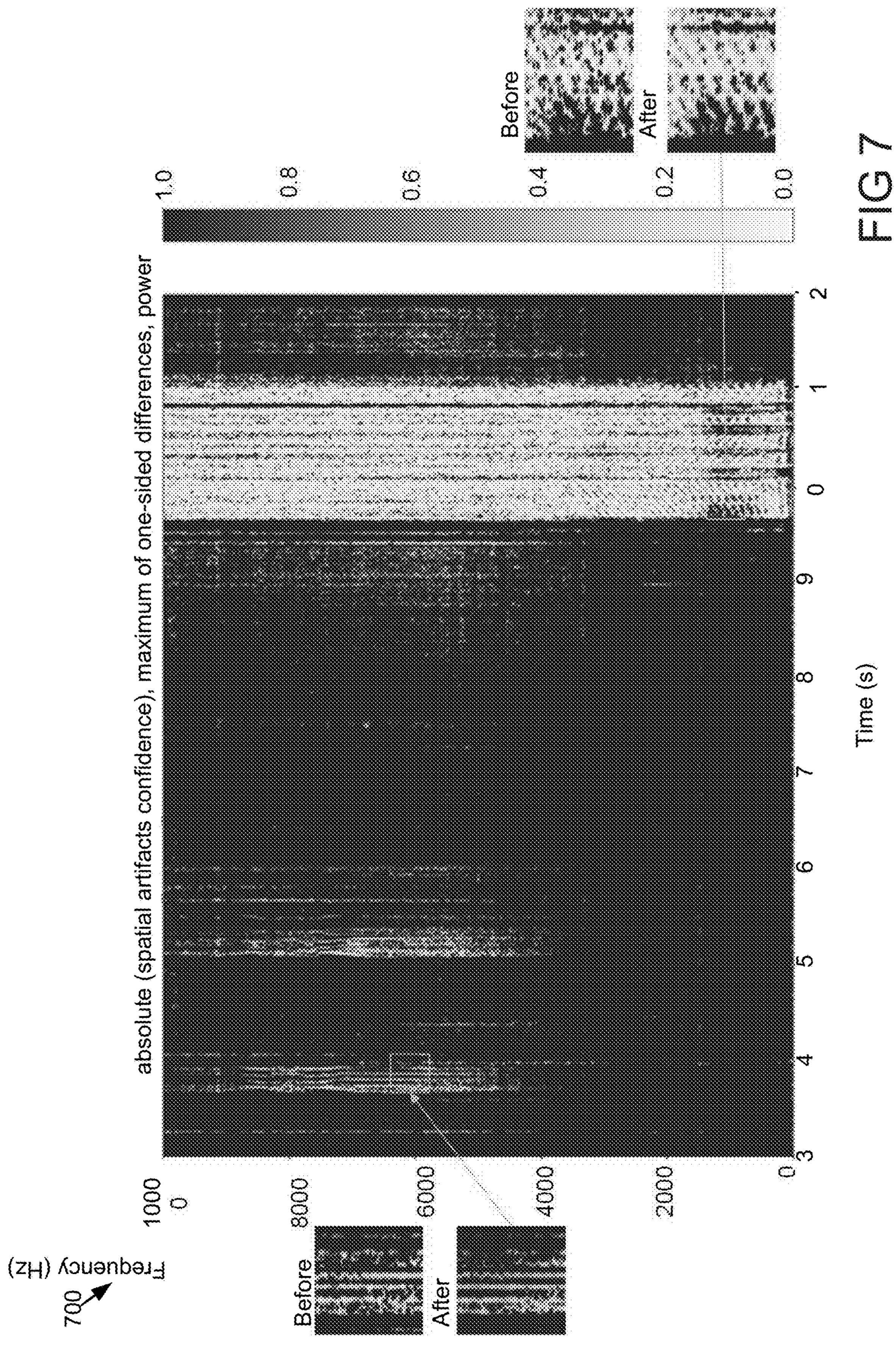

FIG. 7 illustrates an example spectrogram 700 that is the same as FIG. 6 along with before and after examples of how the spatial artifacts appear after the filtering is performed.

Figure 8:
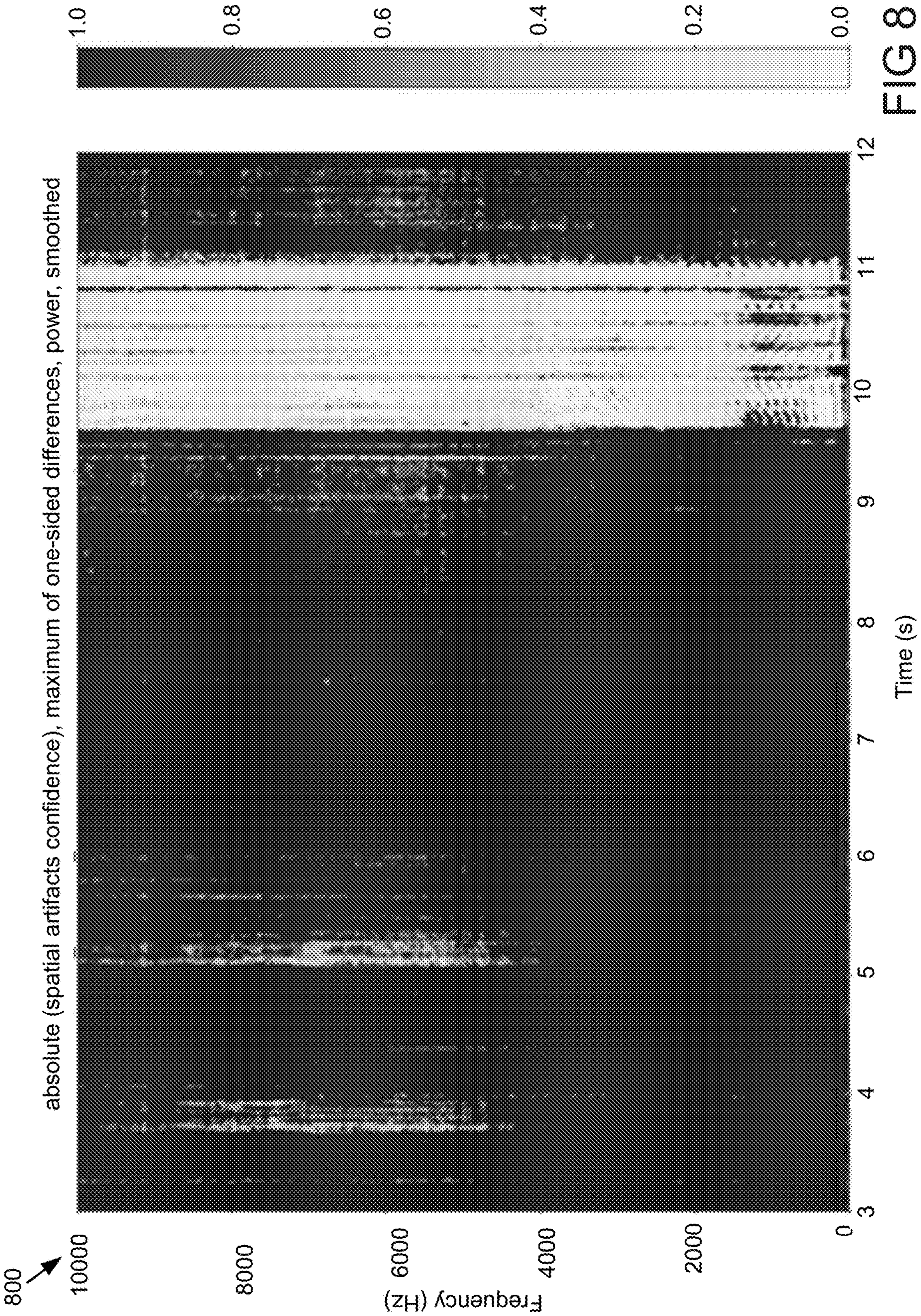

FIG. 8 illustrates an example spectrogram 800 that uses an absolute value of the spatial artifact confidence, a maximum of one-sided differences, a power, and smoothing. In this example, the example spectrogram 800 was subjected to a Gaussian smoothing operator that works as a convolution operator in both time and frequency. In some embodiments, both a numerator and denominator were smoothed. The smoothing may be performed by a variety of different operators including non-convolutional operators. For example, since speech spectra tend to decrease quickly in energy above 4 kHz, there could be practical advantage to a smoothing that is stronger/blurrier in higher frequency cells to account for the lower signal to noise ratio.

Figure 9:
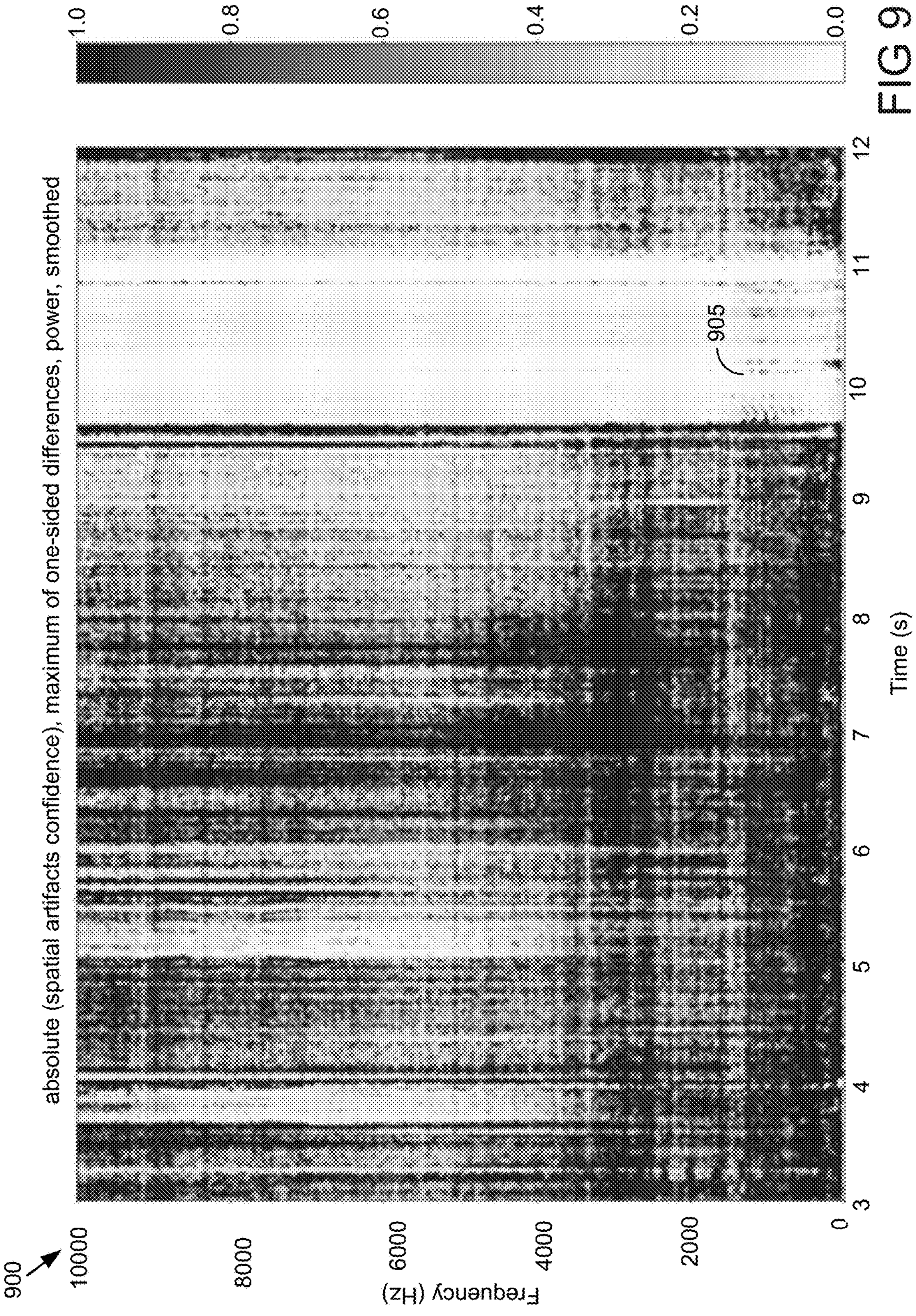

FIG. 9 illustrates an example spectrogram 900 of the $\alpha$ array after the spatial artifacts process has been applied, where the spatial artifact tolerance=50. As compared to FIG. 8, FIG. 9 illustrates the results of spatial artifact removal with a larger spatial artifact tolerance threshold to show the effect of this parameter. As a result of the change in spatial artifact tolerance, more of the original signal is retained in the final output.

Example Flowchart

Figure 10:
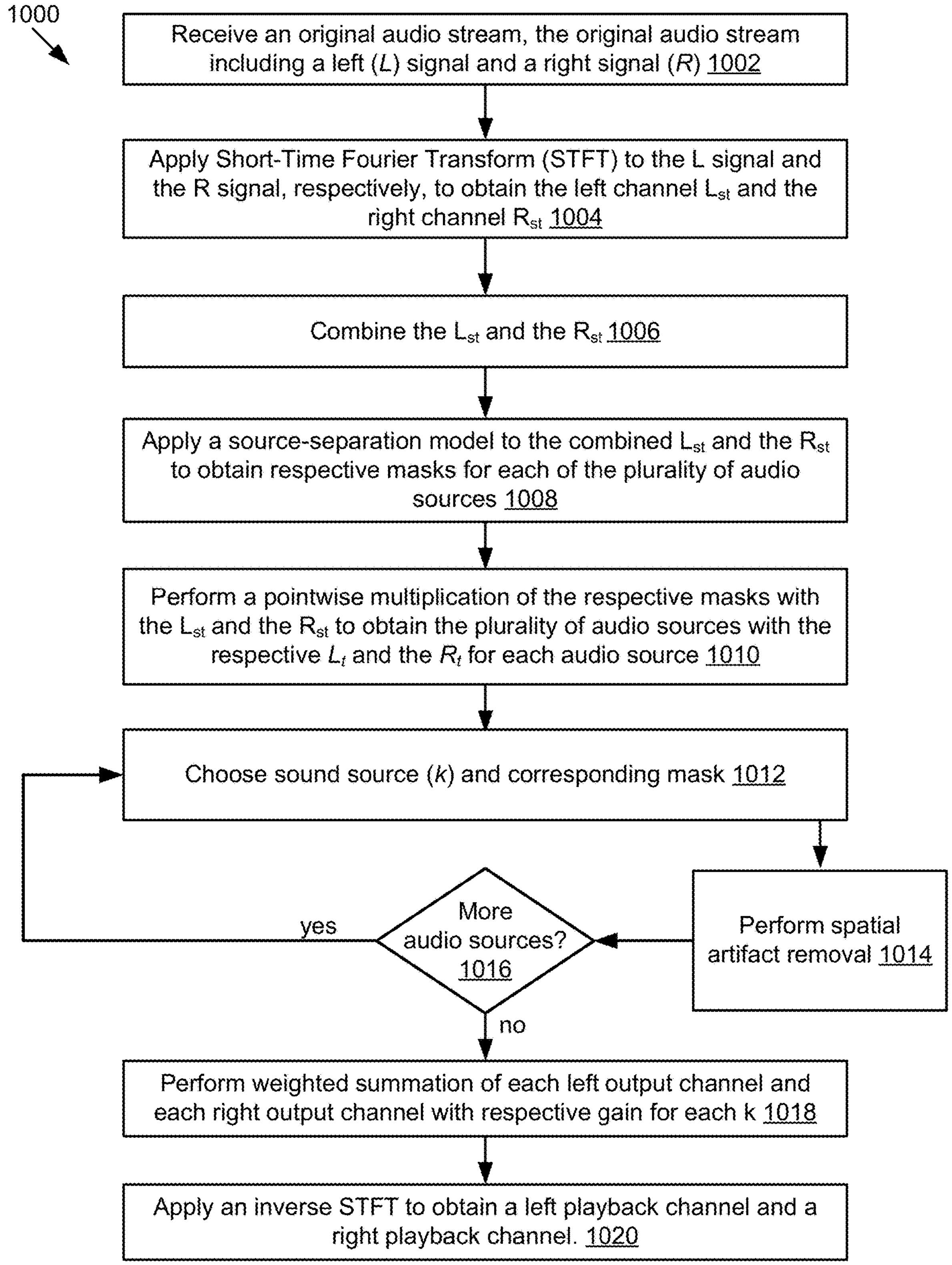
FIG. 10 illustrates a flowchart of an example method to remove spatial artifacts in audio, according to some embodiments described herein.

FIG. 10 illustrates an example flowchart of a method 1000 to remove spatial artifacts in audio, according to some embodiments described herein. The method 1000 includes an audio stream comprising a plurality (n) of audio sources with a respective left ($L_t$) channel and a right ($R_t$) channel for each source, the audio sources being separated from an original audio stream, wherein the $L_t$ channel and the $R_t$ channel are in a time-frequency representation.

The method 1000 may be performed by the computing device 200 in FIG. 2. In some embodiments, the method 1000 is performed by the user device 115 of FIG. 1.

The method 1000 of FIG. 10 may begin at block 1002. At block 1002, an original audio stream is received, the original audio stream including a left (L) signal and a right signal (R). In some embodiments, the original audio stream is separated from a video. Block 1002 may be followed by block 1004.

At block 1004, an STFT is applied to the L signal and the R signal, respectively, to obtain the left channel $L_{st}$ and the right channel $R_{st}$. Block 1004 may be followed by block 1006.

At block 1006, the $L_{st}$ and the $R_{st}$ are combined. In some embodiments, combining the $L_{st}$ and the $R_{st}$ includes calculating an average of the $L_{st}$ and the $R_{st}$ and calculating a magnitude of the average. Block 1006 may be followed by block 1008.

At block 1008, a source-separation model is applied to the combined $L_{st}$ and the $R_{st}$ to obtain respective masks for each of the plurality of audio sources. Block 1008 may be followed by block 1010.

At block 1010, a pointwise multiplication of the respective masks with the $L_{st}$ and the $R_{st}$ is performed to obtain the plurality of audio sources with the respective $L_t$ and the $R_t$ for each audio source. Block 1010 may be followed by block 1012.

At block 1012, a sound source (k) and corresponding mask are chosen. Block 1012 may be followed by block 1014.

At block 1014, spatial artifact removal is performed on the chosen sound source and the corresponding mask. The spatial artifact removal process may include the method 1100 described in FIG. 11. Block 1014 may be followed by block 1016.

At block 1016, it is determined whether there are more audio sources. If there are more audio sources, block 1016 may be followed by block 1012. If there are no more audio sources, block 1016 may be followed by block 1018.

At block 1018, a weighted summation of each left output channel and each right output channel is performed. Block 1018 may be followed by block 1020.

At block 1020, an inverse STFT is applied to obtain a left playback channel and a right playback channel.

Figure 11:
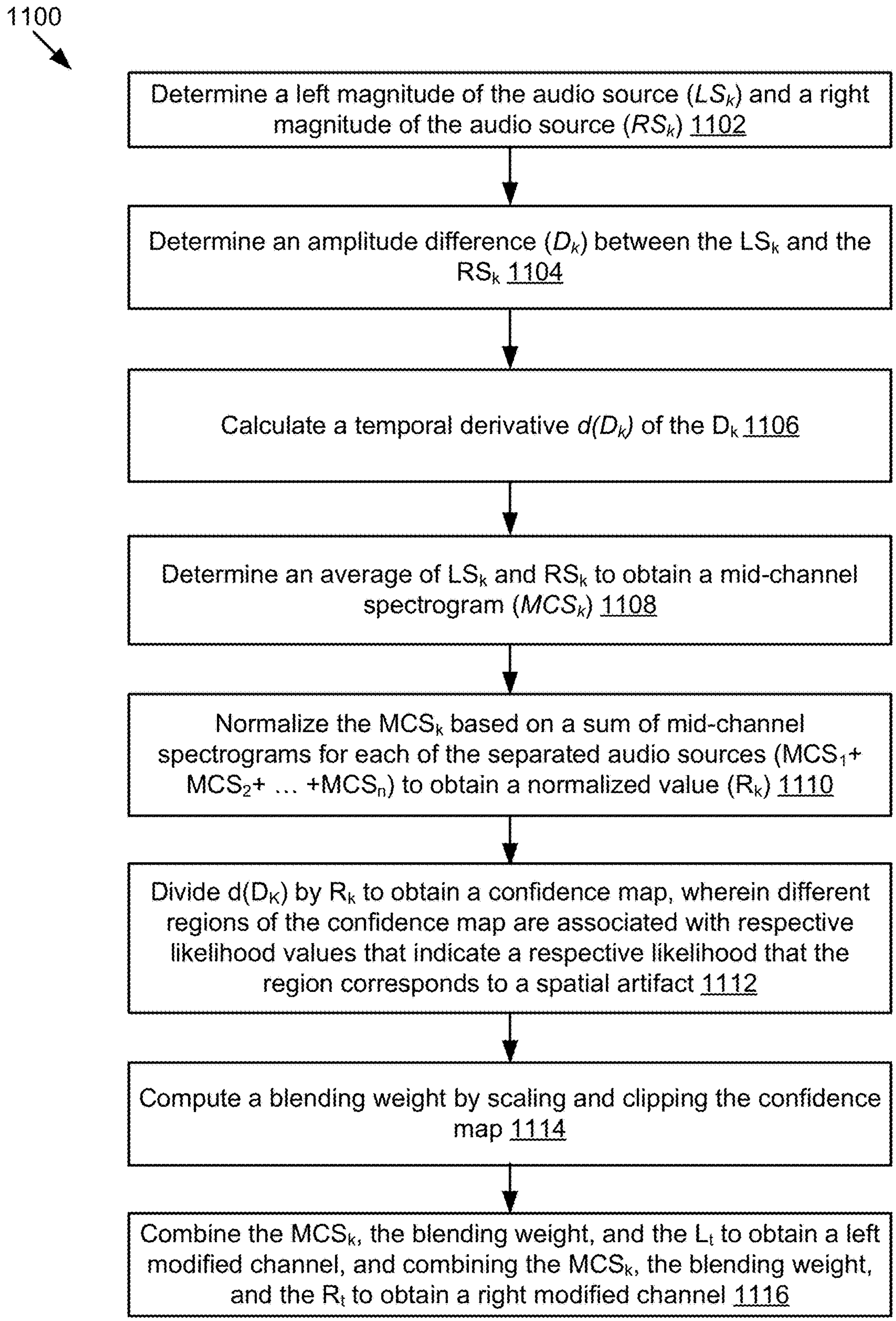
FIG. 11 illustrates a flowchart of another example method to remove spatial artifacts in audio, according to some embodiments described herein.

FIG. 11 illustrates an example flowchart of another method 1100 to remove spatial artifacts in audio, according to some embodiments described herein. The method 1200 includes an audio stream comprising a plurality (n) of audio sources with a respective left ($L_t$) channel and a right ($R_t$) channel for each source, the audio sources being separated from an original audio stream, wherein the $L_t$ channel and the $R_t$ channel are in a time-frequency representation. The method 1200 may be performed by the computing device 200 in FIG. 2. In some embodiments, the method 1100 is performed by the user device 115 of FIG. 1.

The method 1100 of FIG. 11 may begin at block 1102. At block 1102, a left magnitude of the audio source ($LS_k$) and a right magnitude of the audio source ($RS_k$) are determined. Block 1102 may be followed by block 1104.

At block 1104, an amplitude difference ($D_k$) between the $LS_k$ and the $RS_k$ is determined. Block 1104 may be followed by block 1106.

At block 1106, a temporal derivative $d(D_k)$ of the $D_k$ is calculated. Block 1106 may be followed by block 1108.

At block 1108, an average of $LS_k$ and $RS_k$ to obtain a mid-channel spectrogram ($MCS_k$) is determined. Block 1108 may be followed by block 1110.

At block 1110, the $MCS_k$ is normalized based on a sum of mid-channel spectrograms for each of the separated audio sources ($MCS_1+MCS_2+ \ldots +MCS_n$) to obtain a normalized value ($R_k$). Block 1110 may be followed by block 1112.

At block 1112, $d(D_K)$ is divided by $R_k$ to obtain a confidence map, wherein different regions of the confidence map are associated with respective likelihood values that indicate a respective likelihood that the region corresponds to a spatial artifact. Block 1112 may be followed by block 1114.

At block 1114, a blending weight is computed by scaling and clipping the confidence map. Block 1114 may be followed by block 1216.

At block 1116, the $MCS_k$, the blending weight, and the $L_t$ are combined to obtain a left modified channel, and the $MCS_k$, the blending weight, and the $R_t$ are combined to obtain a right modified channel.

In some embodiments, the method 1100 further includes performing a summation of the left modified channel of two or more of the audio sources to obtain a left output channel and a summation the right modified channel of the two or more of the audio sources to obtain a right output channel. In some embodiments, the method 1100 further includes receiving a command to erase a particular audio source, where the two or more of the audio sources exclude the particular audio source. In some embodiments, performing the summation comprises applying a respective weight to each of the two or more audio sources.

In some embodiments, the method 1100 further includes performing an inverse Short-Time Fourier Transform (STFT) on the left output channel to obtain a left playback channel and on the right output channel to obtain a right playback channel, where the left playback channel and the right playback channel are usable to output audio via a speaker.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to remove spatial artifacts from an audio stream comprising a plurality (n) of audio sources with a respective left ($L_t$) channel and a right ($R_t$) channel for each source, the plurality of audio sources being separated from an original audio stream, wherein the $L_t$ channel and the $R_t$ channel are in a time-frequency representation, the method comprising, for each audio source (k):

determining a left magnitude of the audio source ($LS_k$) and a right magnitude of the audio source ($RS_k$);

determining an amplitude difference ($D_k$) between the $LS_k$ and the $RS_k$;

calculating a temporal derivative $d(D_k)$ of the $D_k$;

determining an average of $LS_k$ and $RS_k$ to obtain a mid-channel spectrogram ($MCS_k$);

normalizing the $MCS_k$ based on a sum of mid-channel spectrograms for each of the separated audio sources ($MCS_1+MCS_2+\ldots+MCS_n$) to obtain a normalized value ($R_k$);

dividing $d(D_k)$ by $R_k$ to obtain a confidence map, wherein different regions of the confidence map are associated with respective likelihood values that indicate a respective likelihood that the region corresponds to a spatial artifact;

computing a blending weight by scaling and clipping the confidence map;

combining the $MCS_k$, the blending weight, and the $L_t$ to obtain a left modified channel, and combining the $MCS_k$, the blending weight, and the $R_t$ to obtain a right modified channel, wherein the spatial artifacts are substantially reduced or removed from the left modified channel and the right modified channel; and outputting a modified audio stream based on the left modified channel and the right modified channel of each audio source of the plurality of audio sources.

2. The method of claim 1, further comprising performing a summation of the left modified channel of two or more of the audio sources to obtain a left output channel and a summation of the right modified channel of the two or more of the audio sources to obtain a right output channel, wherein the modified audio stream includes the left output channel and the right output channel.

3. The method of claim 2, further comprising performing an inverse Short-Time Fourier Transform (STFT) on the left output channel to obtain a left playback channel and on the right output channel to obtain a right playback channel, wherein the left playback channel and the right playback channel are usable to output audio via a speaker.

4. The method of claim 3, further comprising receiving a command to erase a particular audio source, wherein the two or more of the audio sources exclude the particular audio source from the left playback channel and the right playback channel.

5. The method of claim 2, wherein performing respective summations comprises applying a respective weight to each of the two or more of the audio sources.

6. The method of claim 1, further comprising:

separating the original audio stream from a video;

providing the original audio stream as input to a source-separation model; and outputting, with the source-separation model, the audio stream comprising the plurality of audio sources.

7. The method of claim 1, wherein the original audio stream includes a left (L) signal and a right signal (R) and further comprising, prior to determining the $LS_k$ and the $RS_k$:

applying Short-Time Fourier Transform (STFT) to the L signal and the R signal, respectively, to obtain a left channel ($L_{st}$) and a right channel ($R_{st}$);

combining the $L_{st}$ and the $R_{st}$;

applying a source-separation model to the combined $L_{st}$ and $R_{st}$ to obtain respective masks for each of the plurality of audio sources; and performing a pointwise multiplication of the respective masks with the $L_{st}$ and the $R_{st}$ to obtain the plurality of audio sources with the respective $L_t$ and the $R_t$ for each audio source.

8. The method of claim 7, wherein combining the $L_{st}$ and the $R_{st}$ comprises:

calculating an average of the $L_{st}$ and the $R_{st}$; and calculating a magnitude of the average.

9. A non-transitory computer-readable medium to remove spatial artifacts from an audio stream comprising a plurality (n) of audio sources with a respective left ($L_t$) channel and a right ($R_t$) channel for each source, the plurality of audio sources being separated from an original audio stream, wherein the $L_t$ channel and the $R_t$ channel are in a time-frequency representation with instructions stored thereon that, when executed by one or more computers, cause the one or more computers to perform operations, the operations comprising, for each audio source (k):

determining a left magnitude of the audio source ($LS_k$) and a right magnitude of the audio source ($RS_k$);

determining an amplitude difference ($D_k$) between the $LS_k$ and the $RS_k$;

calculating a temporal derivative $d(D_k)$ of the $D_k$;

determining an average of $LS_k$ and $RS_k$ to obtain a mid-channel spectrogram ($MCS_k$);

normalizing the $MCS_k$ based on a sum of mid-channel spectrograms for each of the separated audio sources ($MCS_1+MCS_2+\ldots+MCS_n$) to obtain a normalized value ($R_k$);

dividing $d(D_k)$ by $R_k$ to obtain a confidence map, wherein different regions of the confidence map are associated with respective likelihood values that indicate a respective likelihood that the region corresponds to a spatial artifact;

computing a blending weight by scaling and clipping the confidence map;

combining the $MCS_k$, the blending weight, and the $L_t$ to obtain a left modified channel, and combining the $MCS_k$, the blending weight, and the $R_t$ to obtain a right modified channel, wherein the spatial artifacts are substantially reduced or removed from the left modified channel and the right modified channel; and outputting a modified audio stream based on the left modified channel and the right modified channel of each audio source of the plurality of audio sources.

10. The non-transitory computer-readable medium of claim 9, wherein the operations further include performing a summation of the left modified channel of two or more of the audio sources to obtain a left output channel and a summation of the right modified channel of the two or more of the audio sources to obtain a right output channel, wherein the modified audio stream includes the left output channel and the right output channel.

11. The non-transitory computer-readable medium of claim 10, wherein the operations further include performing an inverse Short-Time Fourier Transform (STFT) on the left output channel to obtain a left playback channel and on the right output channel to obtain a right playback channel, wherein the left playback channel and the right playback channel are usable to output audio via a speaker.

12. The non-transitory computer-readable medium of claim 11, wherein the operations further include receiving a command to erase a particular audio source, wherein the two or more of the audio sources exclude the particular audio source from the left playback channel and the right playback channel.

13. The non-transitory computer-readable medium of claim 10, wherein performing respective summations comprises applying a respective weight to each of the two or more of the audio sources.

14. The non-transitory computer-readable medium of claim 9, wherein the operations further include:

separating the original audio stream from a video;

providing the original audio stream as input to a source-separation model; and outputting, with the source-separation model, the audio stream comprising the plurality of audio sources.

15. The non-transitory computer-readable medium of claim 9, wherein the original audio stream includes a left (L) signal and a right signal (R) and the operations further include, prior to determining the $LS_k$ and the $RS_k$:

applying Short-Time Fourier Transform (STFT) to the L signal and the R signal, respectively, to obtain a left channel ($L_{st}$) and a right channel ($R_{st}$);

combining the $L_{st}$ and the $R_{st}$;

applying a source-separation model to the combined $L_{st}$ and $R_{st}$ to obtain respective masks for each of the plurality of audio sources; and performing a pointwise multiplication of the respective masks with the $L_{st}$ and the $R_{st}$ to obtain the plurality of audio sources with the respective $L_t$ and the $R_t$ for each audio source.

16. A computing device to remove spatial artifacts from an audio stream comprising a plurality (n) of audio sources with a respective left ($L_t$) channel and a right ($R_t$) channel for each source, the audio sources being separated from an original audio stream, wherein the $L_t$ channel and the $R_t$ channel are in a time-frequency representation, the computing device comprising:

a processor; and a memory coupled to the processor, with instructions stored thereon that, when executed by the processor, cause the processor to perform operations comprising, for each audio source (k):

determining a left magnitude of the audio source ($LS_k$) and a right magnitude of the audio source ($RS_k$);

determining an amplitude difference ($D_k$) between the $LS_k$ and the $RS_k$;

calculating a temporal derivative $d(D_k)$ of the $D_k$;

determining an average of $LS_k$ and $RS_k$ to obtain a mid-channel spectrogram ($MCS_k$);

normalizing the $MCS_k$ based on a sum of mid-channel spectrograms for each of the separated audio sources ($MCS_1+MCS_2+ \ldots +MCS_n$) to obtain a normalized value ($R_k$);

dividing $d(D_k)$ by $R_k$ to obtain a confidence map, wherein different regions of the confidence map are associated with respective likelihood values that indicate a respective likelihood that the region corresponds to a spatial artifact;

computing a blending weight by scaling and clipping the confidence map;

combining the $MCS_k$, the blending weight, and the $L_t$ to obtain a left modified channel, and combining the $MCS_k$, the blending weight, and the $R_t$ to obtain a right modified channel, wherein the spatial artifacts are substantially reduced or removed from the left modified channel and the right modified channel; and outputting a modified audio stream based on the left modified channel and the right modified channel of each audio source of the plurality of audio sources.

17. The computing device of claim 16, wherein the operations further include performing a summation of the left modified channel of two or more of the audio sources to obtain a left output channel and a summation of the right modified channel of the two or more of the audio sources to obtain a right output channel, wherein the modified audio stream includes the left output channel and the right output channel.

18. The computing device of claim 17, wherein the operations further include performing an inverse Short-Time Fourier Transform (STFT) on the left output channel to obtain a left playback channel and on the right output channel to obtain a right playback channel, wherein the left playback channel and the right playback channel are usable to output audio via a speaker.

19. The computing device of claim 18, wherein the operations further include receiving a command to erase a particular audio source, wherein the two or more of the audio sources exclude the particular audio source from the left playback channel and the right playback channel.

20. The computing device of claim 17, wherein performing respective summations comprises applying a respective weight to each of the two or more of the audio sources.

* * * * *